(12) United States Patent
Akhlagi et al.

(10) Patent No.: US 6,509,893 B1
(45) Date of Patent: Jan. 21, 2003

(54) READING PEN

(75) Inventors: Noroz Nader Akhlagi, Lund (SE); Fredrik Lonn, Lund (SE); Peter Wittrup, Lund (SE)

(73) Assignee: C Technologies AB, Lund (SE)

( * ) Notice: Subject to any disclaimer, the term of this patent is extended or adjusted under 35 U.S.C. 154(b) by 55 days.

(21) Appl. No.: 09/605,096

(22) Filed: Jun. 27, 2000

Related U.S. Application Data
(60) Provisional application No. 60/144,714, filed on Jul. 20, 1999.

(30) Foreign Application Priority Data

Jun. 28, 1999 (SE) .................................................. 9902438

(51) Int. Cl.$^7$ ................................................. G09G 5/08
(52) U.S. Cl. ........................... 345/179; 382/59; 382/65; 382/67; 382/312; 382/313; 382/314; 382/318; 345/165; 345/166; 358/473
(58) Field of Search ................................. 382/312, 313, 382/314, 59, 65, 67, 318; 345/165, 166, 179; 358/473

(56) References Cited

U.S. PATENT DOCUMENTS

| | | | |
|---|---|---|---|
| 3,868,514 A | * 2/1975 | Israelsson | 250/566 |
| 3,947,817 A | 3/1976 | Requa et al. | |
| 4,851,746 A | * 7/1989 | Mike | 318/467 |
| 5,574,804 A | * 11/1996 | Olschafskie et al. | 382/313 |
| 5,974,204 A | * 10/1999 | Lin et al. | 382/314 |
| 5,999,666 A | * 12/1999 | Gobeli et al. | 382/313 |
| 6,218,964 B1 | * 4/2001 | Ellis | 340/990 |
| 6,243,503 B1 | * 6/2001 | Teufel et al. | 382/312 |
| 6,270,013 B1 | * 8/2001 | Lipman et al. | 235/454 |

FOREIGN PATENT DOCUMENTS

| | | |
|---|---|---|
| WO | WO9715896 | 5/1997 |
| WO | WO9820446 | 5/1998 |

* cited by examiner

*Primary Examiner*—Richard Hjerpe
*Assistant Examiner*—Jennifer T. Nguyen
(74) *Attorney, Agent, or Firm*—Cooper & Dunham LLP

(57) ABSTRACT

A reading pen for reading text has an elongate casing with a reading opening (3) formed in one end thereof, a printed circuit board (5) which is arranged inside the casing, light-emitting diodes (7a, 7b)) arranged inside the reading opening and adapted to illuminate the text that is to be read, and a light-sensitive sensor (9) arranged inside the reading opening and adapted to read the illuminated text. The printed circuit board (5) has an end portion at said one end of the casing. The end portion essentially corresponds to the form of the casing. The light-emitting diodes (7a, 7b) and the light-sensitive sensor (9) are arranged on said end portion.

12 Claims, 3 Drawing Sheets

READING PEN

CROSS REFERENCE TO RELATED APPLICATION

This application claims the benefit of U.S. Provisional Application No. 60/144,714, filed Jul. 20, 1999.

FIELD OF THE INVENTION

The present invention relates to a reading pen for reading text, which has an elongate casing with a reading opening formed in one end thereof, a printed circuit board arranged inside the casing, light-emitting diodes arranged inside the reading opening and adapted to illuminate the text that is to be read, and a light-sensitive sensor arranged inside the reading opening and adapted to read the illuminated text.

BACKGROUND OF THE INVENTION

A reading pen of the type described above is known from SE 9604008-4. It is also sold by the applicant under the trademark C-PEN. The reading pen is intended for selective recording of text from, for instance, books. The recorded text can be stored and edited in the pen. It can also be transmitted in a wireless manner to another computer.

The prior-art reading pen has, among other things, a casing, a light-sensitive sensor, a flexible card, a lens system, a printed circuit board and a reflector.

The casing which is made of a plastic material is designed as a pen with a narrowing end, in which a reading opening is formed, through which the text is read. In the casing there is a display which shows the read text.

The flexible card is a soft and flexible card having a complicated shape. It supports the light-sensitive sensor and a plurality of, usually ten, Light-emitting diodes which are uniformly distributed round an opening in the flexible card. The flexible card is essentially arranged in the narrowing end of the casing.

The lens system, which comprises a lens and a mirror, is placed on top of the light-sensitive sensor. The light-sensitive sensor is arranged perpendicular to the reading opening, and the mirror in the lens system is adapted to reflect the imaged text at an angle of 90 degrees to the light-sensitive sensor.

The printed circuit board is a hard and essentially rectangular card, on which a plurality of components for processing the recorded information are arranged. It is arranged in the casing inside the narrowing end thereof.

When reading text, the text must be illuminated. This is carried out by means of the light-emitting diodes, which have a wavelength corresponding to that to which the light-sensitive sensor is most sensitive. This wavelength is between 500 and 700 nm and corresponds to read light. That part of the flexible card on which the light-emitting diodes are arranged is placed just inside the reading opening so that the opening of the flexible card is positioned opposite to the reading opening. The light-emitting diodes are arranged to illuminate the text through the reading opening, and their light is uniformly reflected by means of the reflector which is placed round the reading opening.

The flexible card, on which the light-sensitive sensor and the light-emitting diodes are arranged, is expensive to manufacture and also difficult and time-consuming to mount, since it must be mounted manually.

SUMMARY OF THE INVENTION

The object of the present invention therefore is to provide a sensor/light-emitting-diode arrangement which is easier and less expensive to manufacture.

According to the invention, this object is achieved by means of a reading pen which is of the type stated by way of introduction and has the features that appear from appended claim 1.

More specifically, the invention concerns a reading pen for reading text, which has an elongate casing with a reading opening formed in one end thereof, a printed circuit board which is arranged in the casing, light-emitting diodes arranged inside the reading opening and adapted to illuminate the text which is to be read and a light-sensitive sensor arranged inside the reading opening and adapted to read the illuminated text, the printed circuit board having an end portion at said one end of the casing, said end portion essentially corresponding to the form of the casing, and the light-emitting diodes and the light-sensitive sensor being arranged on said end portion.

In the prior-art technique, the light-emitting diodes are mounted on the flexible card, which is expensive and complicated to mount. According to the invention, the light-emitting diodes are mounted on the printed circuit board. This is made possible by an extension of the hard printed circuit board in one end of the casing. In this way, the expensive flexible card can be omitted. Furthermore, the hard printed circuit board has a higher thermal conductivity then the flexible card. This means that the heat emitted by the light-emitting diodes is better and more efficiently removed.

In a preferred embodiment, a reflector is arranged in the reading opening to reflect and diffusely spread the light emitted by the light-emitting diodes. As a result, the sensor obtains a uniform light and no extra software need be implemented to compensate for a non-uniform luminous flux. Advantageously, the reflector is white and reflects the light in a diffuse way. It is located on the inside of the casing from the position where the light-emitting diodes are located up to the opening.

Preferably, the light-emitting diodes are placed on one large face of the printed circuit board and the light-sensitive sensor is placed on the other large face thereof. This yields a uniform and satisfactory illumination and makes the mounting of the light-emitting diodes and the sensor easier. Additionally it prevents the light emitted from the light-emitting diodes from directly reaching the sensor.

In another preferred embodiment, the light-emitting diodes are arranged on both large faces of the printed circuit board. This gives the mounting of the components of the printed circuit board a higher flexibility, since the light-emitting diodes can be arranged where there is free space. Thus the light-emitting diodes are provided with reflectors that direct the light outward.

In a preferred embodiment, a mirror is arranged to angle the ray path essentially 90 degrees to the surface of the sensor. By angling the ray path essentially 90 degrees a distortion of the reflected light (an image) is avoided. Additionally, use can be made of a plane mirror that is easy to manufacture.

In another preferred embodiment, the light-emitting diodes emit light parallel to the surface of the printed circuit board. By using light-emitting diodes, which angle the ray path of the light essentially 90 degrees, the light-emitting diodes can be arranged directly on the printed circuit board. Accordingly, there is no need for an additional construction to arrange the light-emitting diodes in order to have them emit light through the reading opening of the reading pen.

BRIEF DESCRIPTION OF THE DRAWINGS

The invention will now be described in more detail by way of an example and with reference to the accompanying drawings.

DESCRIPTION OF A PREFERRED EMBODIMENT

Figure 1:
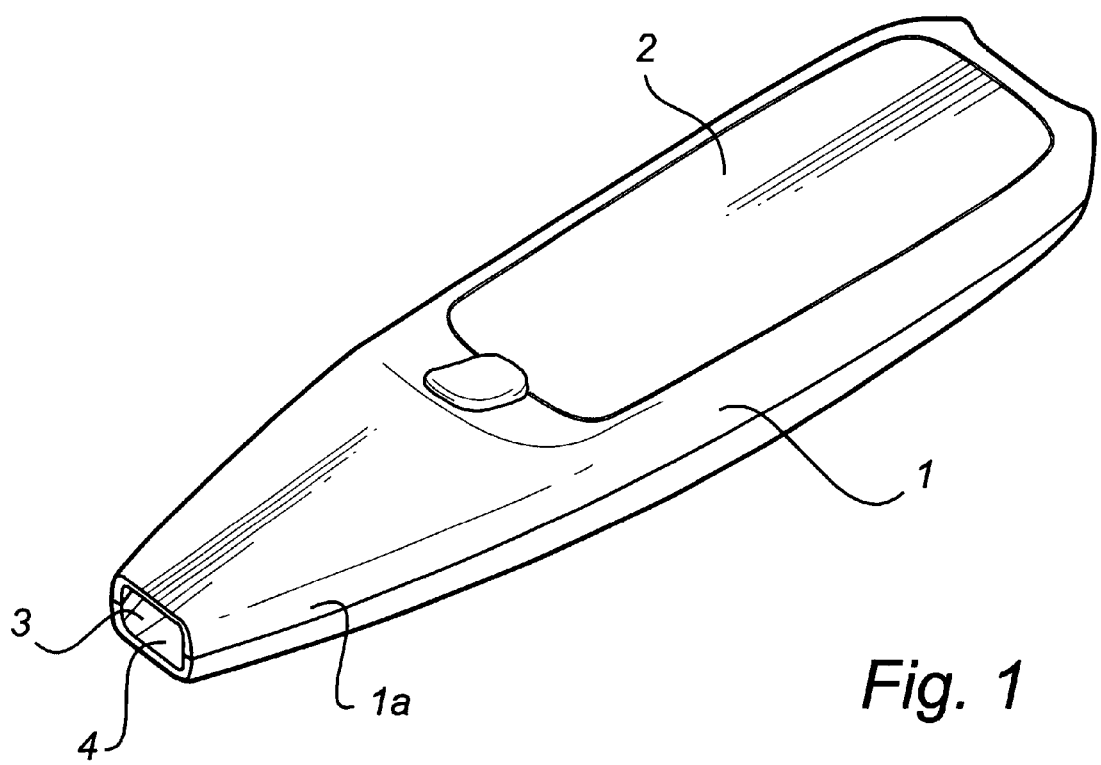
FIG. 1 is a perspective view of a reading pen according to the invention.

The reading pen shown in FIG. 1 has a casing 1 which is made of plastic and has a narrowing front end 1a. A display 2 is arranged on the casing 1. A reading opening 3, in which a funnel-shaped reflector 4 is arranged, is formed in the narrowing end 1a.

Figure 2:
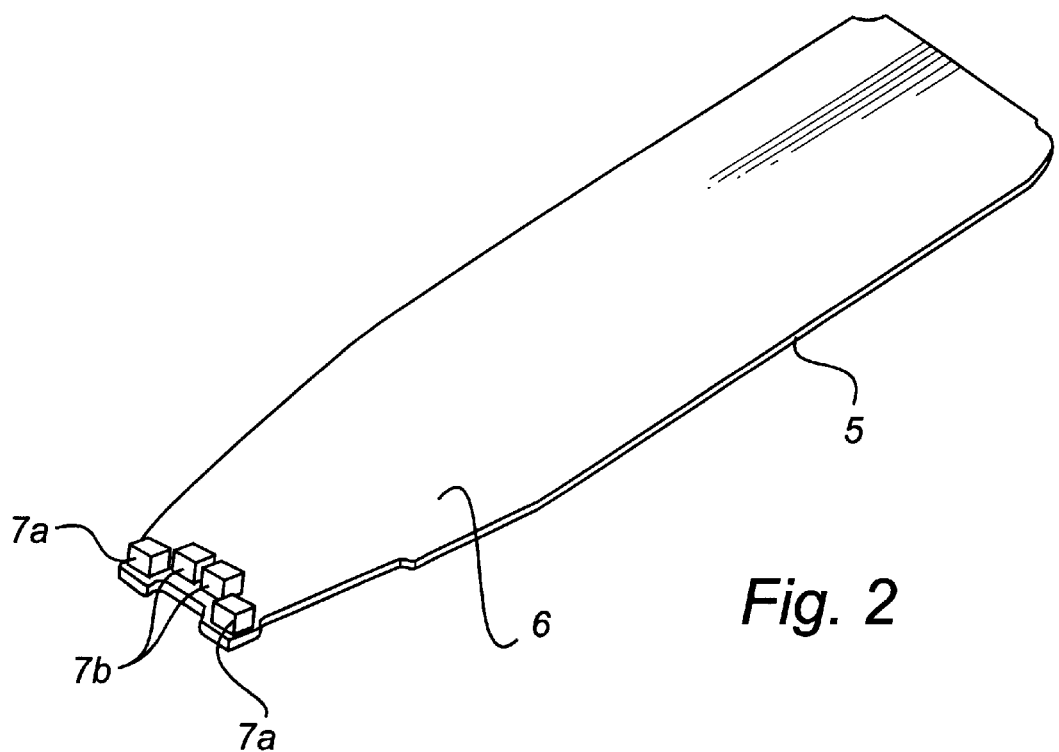
FIG. 2 is a perspective view of one side of a printed circuit board.
Figure 3:
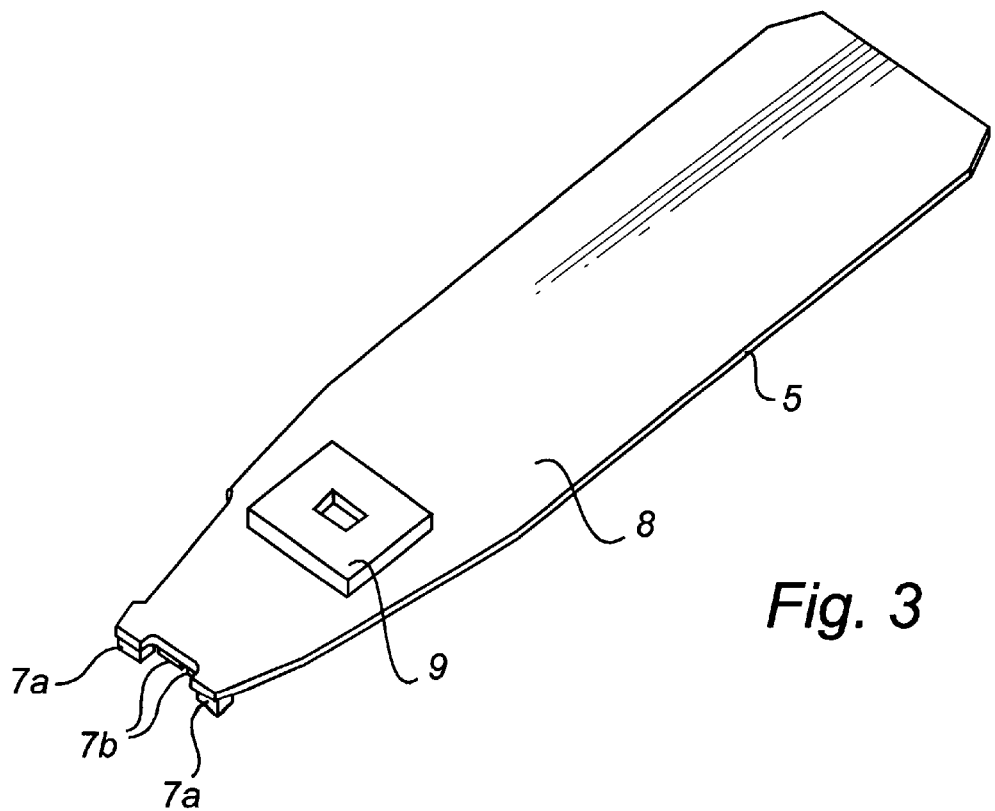
FIG. 3 is a perspective view of the other side of the printed circuit board.

FIGS. 2 and 3 show one large face 6 of a printed circuit board 5, on which large face four light-emitting diodes 7a, 7b are arranged, and the other large face 8 thereof, on which a light-sensitive area sensor 9 is arranged. The printed circuit board 5 is arranged inside the casing 1, and its form essentially corresponds to the inner form of the casing. The printed circuit board 5 thus has a narrowing portion which inside the casing 1 extends to a position in the vicinity of the reading opening 3.

The four light-emitting diodes 7a, 7b are arranged at the outer end of the narrowing portion of the printed circuit board 5. The light-emitting diodes 7a, 7b are juxtaposed and cover the width of the reading opening 3. The two outer light-emitting diodes 7a are positioned closer to the reading opening 3 than the two central light-emitting diodes 7b. The light-emitting diodes 7a, 7b are designed to radiate in parallel with the base on which they are placed and they preferably have built-in mirror, directing the light in said direction.

Figure 4:
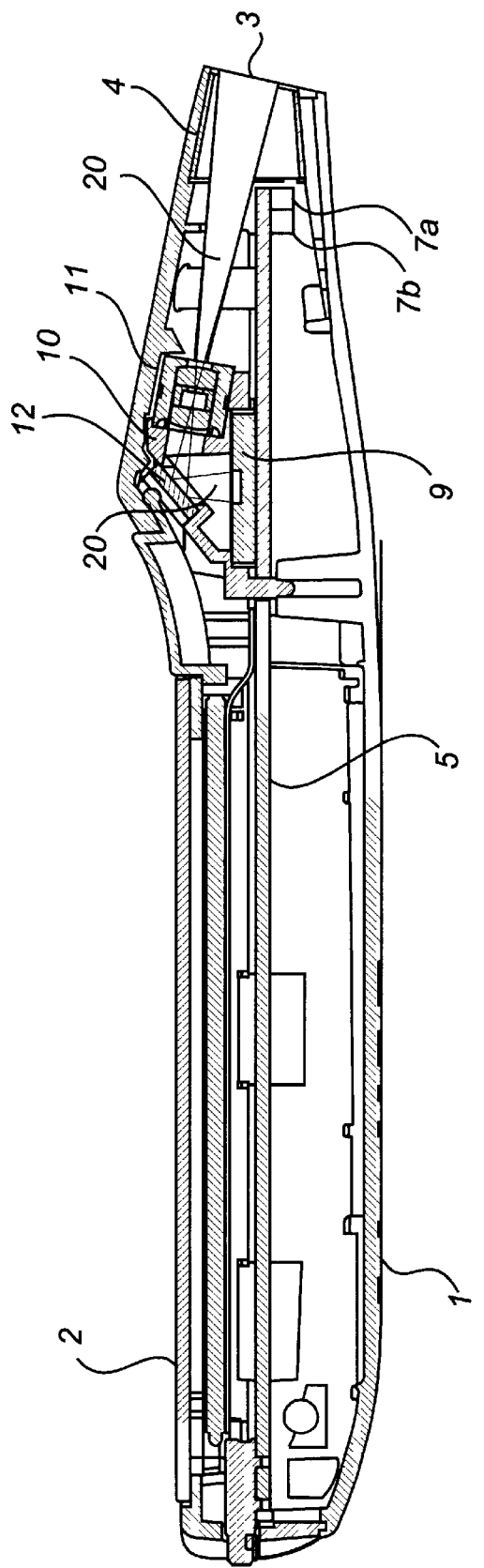
FIG. 4 is a longitudinal sectional view of a reading pen according to the invention.

The light-sensitive area sensor 9 is also arranged on the narrowing portion of the printed circuit board 5. FIG. 4 shows in a longitudinal sectional view of the reading pen how the components are arranged inside the reading pen and the ray path 20 when reading text. A lens system 10 comprising a lens arrangement 11 and a mirror 12 is arranged on the printed circuit board 5. When reading the text, the text is registered by placing the reading opening 3 of the reading pen against the text. The light-emitting diodes 7a, 7b emit light towards the text that is to be registered. The ray path 20 of the reflected light moves from the reading opening 3 to the lens arrangement 11 and further to the mirror 12, that angles the ray path 20 essentially perpendicular to the surface of the area sensor 9. Although a specific embodiment of the invention has been described above, it is obvious to a person skilled in the art that many alternatives, modifications and variations are feasible in the light of the above description. For example, the reading pen can have an extent of uniform thickness, which means that the end 1a, in which the reading; opening 3a is formed, does not narrow. Moreover, it is not necessary for all the light-emitting diodes 7a, 7b to be arranged on one large face 6, but a certain number of light-emitting diodes 7a, 7b can be arranged on one large face 6 and a certain number of light-emitting diodes 7a, 7b can be arranged on the other large face 8. The invention therefore intends to comprise all such alternatives, modifications and variations as fall within the scope of the appended claims.

What is claimed is:

1. A handheld device for reading an image such as printed text on a substrate, said device having an elongate casing with a reading opening arranged in one end thereof, a printed circuit board arranged inside the casing, light-emitting diodes arranged inside the reading opening and adapted to illuminate the image to be read, and a light-sensitive sensor arranged inside the reading opening and adapted to read the illuminated image, the printed circuit board having an end portion at said one end of the casing, said end portion substantially corresponding to the form of the casing, the longitudinal extension of the circuit board being directed towards the image; and the light-emitting diodes are arranged at a first side of said circuit board on said end portion directing light essentially parallel with said circuit board towards said image; and the light-sensitive sensor being arranged on said end portion at a second side of said circuit board to receive light from said image illuminated by said light-emitting diodes.

2. A device as claimed in claim 1, wherein a reflector is arranged in the reading opening to reflect and diffusely spread the light emitted by the light-emitting diodes.

3. A device as claimed in claim 1, wherein the light-emitting diodes are juxtaposed and essentially cover the width of the reading opening.

4. A device as claimed in claim 1, wherein the said one end of the elongate casing has a narrowing shape.

5. A device as claimed in claim 1, wherein a mirror is arranged to angle a ray path essentially 90 degrees to the surface of the sensor.

6. A device as claimed in claim 1, wherein said sensor is a two-dimensional sensor having a sensor surface, which is arranged parallel to the circuit board at said second side of said circuit board, and that a mirror arrangement is adapted to divert light rays emanating from the image illuminated by said light emitting diodes essentially 90 degrees towards said sensor surface, and a focusing arrangement for focusing said image at said sensor surface.

7. A device as claimed in claim 1, further comprising:
a focusing device for focusing said image at said sensor surface, said focusing device comprising at least one mirror arrangement for diverting light rays from said image substantially 90 degrees towards said sensor surface.

8. A handheld device for reading an image such as printed text on a substrate, said device comprising:
an elongated casing with a reading opening arranged in one end thereof,
a printed circuit board arranged inside the casing, said printed circuit board having an end portion at said one end of the casing, an extension of the circuit board being directed towards the image;
at least one light-emitting diode arranged inside the reading opening and adapted to illuminate the image to be read, said light-emitting diode being arranged at a first side of said circuit board on said end portion directing light essentially parallel with said circuit board towards said image;
a light-sensitive two-dimensional sensor having a sensor surface arranged inside the reading opening and adapted to read the illuminated image, said sensor being arranged on said end portion at a second side of said circuit board with said sensor surface parallel to the circuit board to receive light from said image illuminated by said light-emitting diodes; and
a focusing device for focusing said image at said sensor surface, said focusing device comprising at least one mirror arrangement for diverting light rays from said image essentially 90 degrees towards said sensor surface.

9. A device as claimed in claim 8, wherein a reflector is arranged in the reading opening to reflect and diffusely spread the light emitted by the light-emitting diodes.

10. A device as claimed in claim 8, wherein the light-emitting diodes are juxtaposed and essentially cover the width of the reading opening.

11. A device as claimed in claim 8, wherein the said one end of the elongate casing has a narrowing shape.

12. A device as claimed in claim 8, wherein a mirror is arranged to angle a ray path essentially 90 degrees to the surface of the sensor.

\* \* \* \* \*